United States Patent [19]
Conley

[11] Patent Number: 5,970,829
[45] Date of Patent: Oct. 26, 1999

[54] APPARATUS AND METHOD FOR MACHINING A HOLLOW GENERALLY CYLINDRICAL WORKPIECE

[75] Inventor: Gary D. Conley, New Boston, Mich.

[73] Assignee: Hayes Lemmerz International, Inc., Northville, Mich.

[21] Appl. No.: 09/183,189

[22] Filed: Oct. 30, 1998

[51] Int. Cl.⁶ ........................................................ B23B 3/00
[52] U.S. Cl. ............................ 82/1.11; 82/112; 279/4.11; 279/4.12; 279/106; 279/133; 279/137
[58] Field of Search .................... 82/1.11, 112; 279/4.01, 279/4.11, 4.12, 106, 35, 132, 133, 137

[56] References Cited

U.S. PATENT DOCUMENTS

| | | | |
|---|---|---|---|
| 2,613,943 | 10/1952 | Trudeau | 279/4.12 |
| 2,851,831 | 9/1958 | Healy | 279/4.12 |
| 3,075,413 | 1/1963 | Healy et al. | 82/112 |
| 3,677,559 | 7/1972 | Andre et al. | |
| 4,067,098 | 1/1978 | Blair, Jr. | |
| 4,953,877 | 9/1990 | Slachta et al. | |
| 5,429,375 | 7/1995 | Mueller et al. | |
| 5,429,376 | 7/1995 | Mueller et al. | |
| 5,441,284 | 8/1995 | Mueller et al. | |
| 5,464,233 | 11/1995 | Hanai | 279/106 |
| 5,820,137 | 10/1998 | Patterson | 279/133 |
| 5,848,795 | 12/1998 | Masatsugu et al. | 279/106 |

*Primary Examiner*—Andrea L. Pitts
*Assistant Examiner*—Monica Smith
*Attorney, Agent, or Firm*—Marshall & Melhorn

[57] ABSTRACT

A fixture for holding a brake drum or other similarly shaped workpiece for machining. The fixture includes a body having a body cavity and a clamping assembly disposed therein. The clamping assembly includes a positioning plate having a plurality of positioning posts secured thereto. The positioning posts are received within fastener apertures formed in the brake drum mounting face for locating the drum within the fixture so that the drum axis is coaxially aligned with the fixture axis for proper machining. The clamping assembly further includes a clamping plate and clamping flange for clamping the mounting face of the brake drum during machining to simulate the compressive forces applied to the drum as it is mounted to a vehicle during operation. The fixture further includes first and second pluralities of chucking assemblies for gripping the body of the brake drum along respective first and second spaced apart planes thereby reducing distortions caused by the cutting tool during machining.

54 Claims, 5 Drawing Sheets

APPARATUS AND METHOD FOR MACHINING A HOLLOW GENERALLY CYLINDRICAL WORKPIECE

BACKGROUND OF THE INVENTION

This invention relates to a fixture for holding a workpiece for machining, and more particularly to a fixture for holding and centering a hollow generally cylindrical or cup shaped workpiece for machining.

Workpieces are typically machined by pressing a cutting tool against the piece to remove portions of the workpiece until the desired dimensions are achieved. A known technique for machining includes holding the workpiece in a fixture and moving the cutting tool relative to the workpiece. The workpiece may be held stationary or it may be moved. It is desirable to machine hollow, generally cylindrical workpieces including brake drums and similarly shaped pieces. The workpiece will hereinafter be referred to as a brake drum, although any suitably shaped workpiece may be used.

The brake drum includes a hollow generally cylindrical body portion defining a longitudinal axis and having radially inner and outer surfaces, and an end portion or mounting face extending radially inwards from one end of the body portion. The brake drums are typically gripped on the radially inner or outer surfaces of the body portion by a plurality of grippers or chucks when the drum is machined. However, gripping the drum in this manner with sufficient pressure to hold it steady during machining tends to distort the cylindrical shape of the drum. Although the drum may have the desired dimensions after machining while it is still held in the fixture, it will often change its shape after the fixture gripping forces are removed. The shape of the finished brake drum may change so much after removing it from the fixture that it no longer has the desired dimensions. Furthermore, additional distortion may occur when the placement and direction of forces against the drum are changed as the cutting tool is moved during machining.

To accommodate the changing forces applied to the brake drum during machining, one prior art fixture device includes a plurality of discrete flexible chucking fingers actuated by a pliable inflatable ring for radially deflecting the fingers into gripping, non-distorting engagement with the body of the drum. Others have used a first plurality of lock-up fingers, and a second plurality of gripping fingers. The lock-up fingers are individually biased radially outward into engagement with the body of the brake drum to initially support the brake drum in a predetermined position, irrespective of the eccentricity of the body wall. The locking fingers locate the brake drum along an axis of the fixture. A bladder flexes the gripping fingers into engagement with the body to support the body for machining. However, the chucks grip the body along a single plane which does not prevent distortions by forces changing in the axial direction.

Another prior art fixture attempts to prevent distortions to a hollow, cylindrical workpiece using a relatively thin wall sleeve together with a sleeve of pliant material to grip the workpiece. The pliant sleeve conforms to the surface of the workpiece and exerts a uniform pressure on the workpiece. However, the forces exerted to hold the workpiece are not always sufficient to hold the workpiece stationary during machining.

It is desirable to hold the brake drum which sufficient pressure to keep the drum stationary during machining without distorting the drum. It is also desirable to locate the drum on the fixture in a manner such that the axis of the drum coaxially aligns with the axis of the fixture.

SUMMARY OF THE INVENTION

This invention is an apparatus to hold or retain a hollow generally cylindrical workpiece such as a brake drum relative to an axis of the workpiece for machining without distorting or deforming the shape of the brake drum. Thus, the apparatus must adapt to the brake drum, retain the brake drum in a manner which simulates the state of the brake drum during operation, and support the brake drum in such a manner that the brake drum will not deform in the axial or radial direction.

The fixture has a body forming a stepped body cavity and includes a clamping assembly for clamping the end portion of the brake drum. The clamping assembly includes a clamping flange having a plurality of apertures and a plurality of receptacles. The clamping assembly includes a positioning plate having a plurality of positioning posts secured thereto. The positioning posts are received within fastener apertures formed in the brake drum mounting face for locating the drum within the fixture so that the drum axis is coaxially aligned with the fixture axis for proper machining. The clamping assembly further includes a clamping plate and clamping flange for clamping the mounting face of the brake drum during machining to simulate the compressive forces applied to the drum as it is mounted to a vehicle during operation.

The fixture further includes first and second pluralities of chucking assemblies for gripping the body of the brake drum along respective first and second spaced apart planes thereby reducing distortions caused by the cutting tool during machining. Each chucking assembly has a chucking finger mounted for radial movement which includes a gripper mounted on the radially inner end thereof for gripping the brake drum. A resilient bladder abuts a lever arm which abuts the chucking finger. The bladders are pressurized to move the chucking finger radially inwards to grip the drum body. The axially spaced apart plurality of chucking assemblies grip the drum along axially spaced apart planes which prevents distortion during machining.

BRIEF DESCRIPTION OF THE DRAWINGS

The object and other objects and advantages of the present invention, will appear more clearly from the following specification in conjunction with the accompanying drawings, in which.

DETAILED DESCRIPTION OF THE PREFERRED EMBODIMENTS

The present invention relates to a fixture for holding a generally cylindrical, cup-shaped workpiece, preferably a brake drum, for machining and a method for a similarly shaped workpiece for machining. It is to be understood that the specific devices illustrated in the attached drawings and described in the following specification are simply an exemplary implementation of the invention defined in the appended claims. Hence, specific dimensions and other physical characteristics relating to the embodiments disclosed herein are not to be considered as limiting, unless the claims expressly state otherwise.

Figure 1:
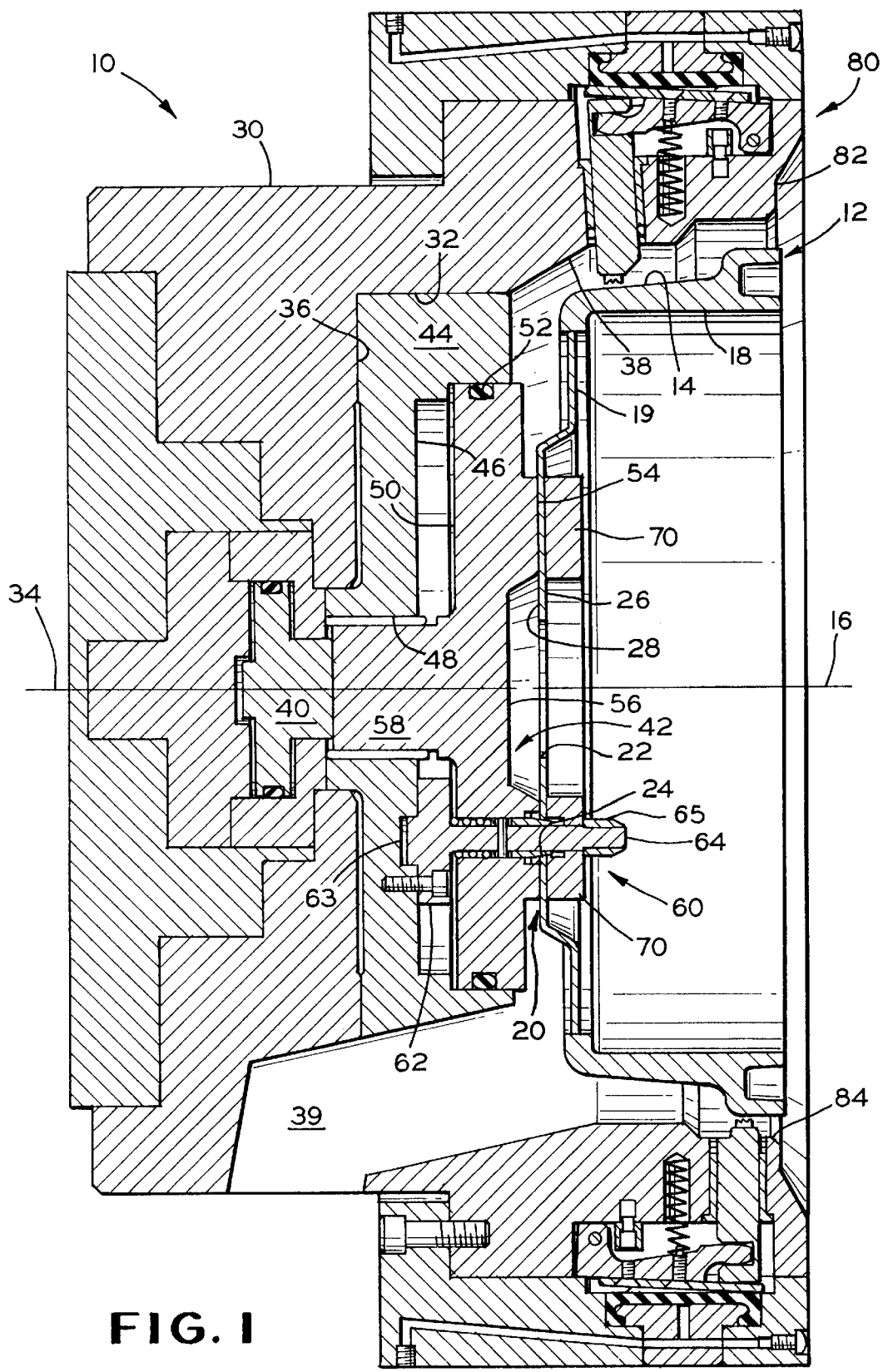
FIG. 1 is a sectional view of a fixture for retaining a cup shaped brake drum for machining in accordance with the present invention.

Referring now to FIG. 1, a fixture 10 is shown for holding a generally cylindrical, cup-shaped workpiece 12. The workpiece 12 is preferably a brake drum, although any suitably shaped workpiece may be used. The brake drum 12 includes a generally cylindrical body portion 14 defining a longitudinal drum axis 16. The term generally cylindrical is not meant to limit the shape of the body portion to a strictly cylindrical shape, and it includes other shapes defining an axis such as stepped or conical configurations. The body portion further includes a radially inner annular surface 18 to be machined to form a braking surface.

The brake drum further includes an end portion 19 extending radially inwards from one end of the body portion 14. The end portion 19 includes a centrally disposed mounting face 20. A center hole 22 is preferably formed concentric to the brake drum axis 16 by stamping or any other known method, although the center hole may be formed after the brake drum is machined in the fixture. The mounting face 20 also includes a plurality of fastener apertures 24 formed in the mounting face 20 by stamping or any other known method. The fastener apertures 24 are disposed in the mounting face 20 at predetermined positions relative to the drum axis 16. The mounting face 20 has an inboard side or inboard mounting face 26 nearest the braking surface 18, and an oppositely disposed outboard side or outboard mounting face 28.

The fixture 10 includes a body 30 having a cylindrical, stepped inner cavity 32 defining a fixture axis 34. The body may include any type of framework for supporting the fixture components and the inner cavity may not be cylindrical as long as it has a centrally disposed axis. The inner cavity 32 includes a closed end 36 and an oppositely disposed open end 38. An optional passage 39 extends through the body 32 and to the body cavity adjacent the open end 38 for use in removing debris and/or dirt from the body cavity. A piston 40 is centrally disposed in the closed end 36 for axial movement as described below.

The fixture 10 further includes a clamping assembly 42 disposed within the body cavity 32 for locating the brake drum 12 in the fixture and clamping the mounting face 20 as described in detail below. The clamping assembly 42 includes a cup-shaped positioning plate 44 having an end portion 46 secured to the body 30 within the body cavity 32 adjacent the closed end 36. A central aperture 48 is disposed in the positioning plate end portion 46 and is coaxially aligned with the piston 40.

A circular clamping plate 50 is disposed for axial movement within the cup-shaped positioning plate 44. A radially outer seal 52 extends around the circumference of the clamping plate 50 and abuts the radially inner surface of the positioning plate 44. The clamping plate 50 includes a clamping face 54 for receiving the brake drum mounting face 20 when the drum is held by the fixture for machining. A centrally disposed recess 56 is formed in the clamping plate clamping face 54 to allow the center hole 22 in the brake drum mounting face 20 to be machined if desired while the drum is clamped to the clamping plate 50. A shaft 58 extending from the clamping plate 50 opposite the clamping face 54, extends through the central aperture 48 of the positioning plate 44 to abut the piston 40.

Figure 2:
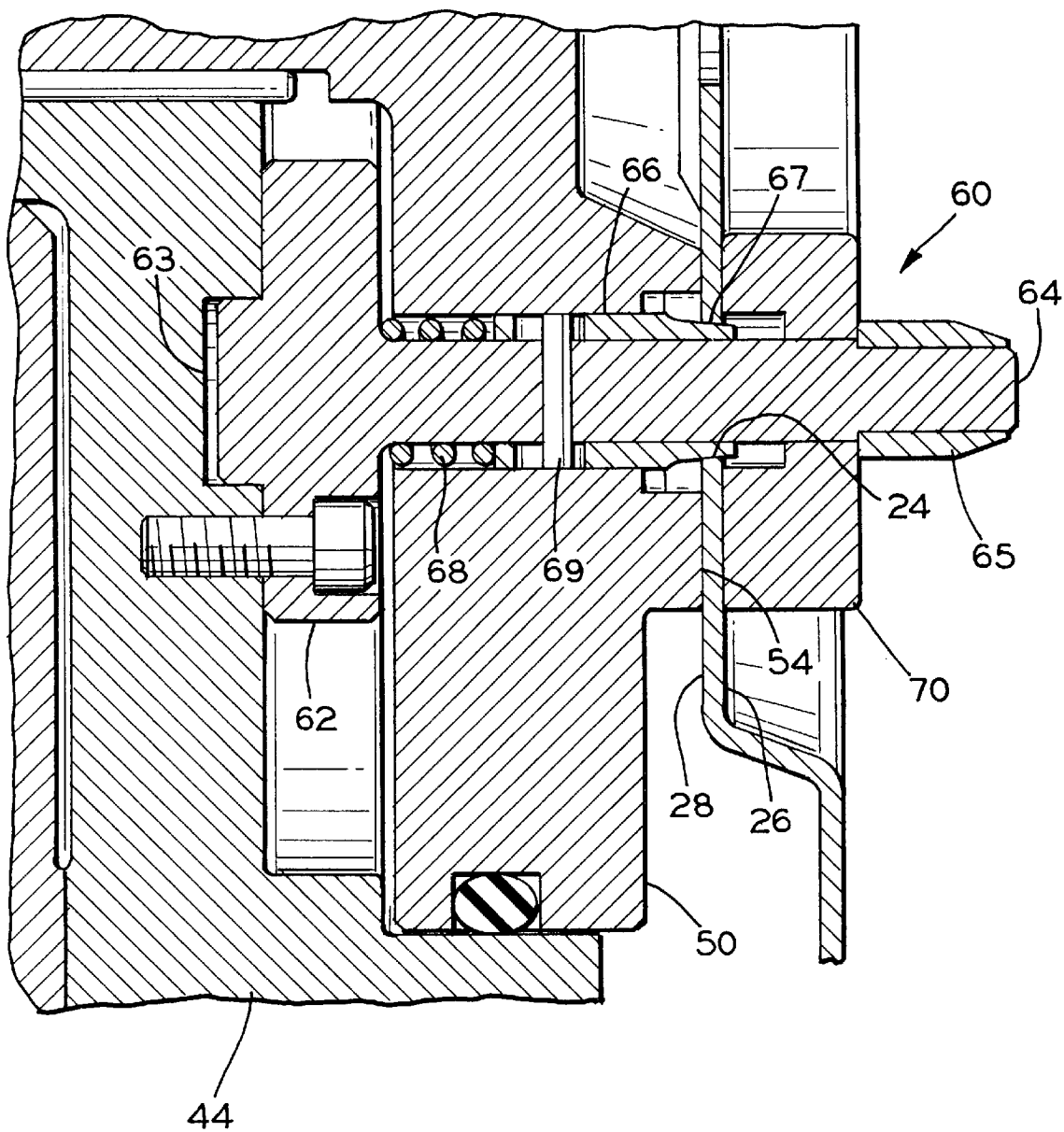
FIG. 2 is a partial sectional view of the positioning post shown in FIG. 1.

Referring now to FIGS. 1 and 2, the clamping assembly 42 further includes a plurality of positioning posts 60 extending from the positioning plate 44 through apertures formed in the clamping plate 50. The positioning posts 60 include a base 62 which is received within a recess 63 formed in a predetermined location in the positioning plate 44 to accurately position the positioning post 60 on the positioning plate. The base 62 is secured to the positioning plate 44 with a bolt, or any other known fastener. The positioning posts 60 further include locating studs 64 extending from the base 62, through the clamping plate 50 and out of the clamping face 54. A retaining cap 65 is disposed on the distal end of each locating stud 64. The outer diameter of the retaining cap 65 is larger than the outer diameter of the locating stud 64. The positioning plate 44 may optionally include an alternate configuration of recesses (not shown) for placing the positioning posts 60 in an alternate arrangement which would allow the fixture 10 to machine a different drum 12 having a different arrangement of fastener apertures 24.

An optional sleeve 66 is coaxially disposed on the locating stud 64 for axial movement. The sleeve 66 includes a tapered portion 67 extending out beyond the clamping face 54. A spring 68 is disposed between the base 62 of the positioning post 60 and the sleeve 66 to urge the sleeve towards the end of the locating stud having the retaining cap 65. A dowel 69 extends radially through the locating stud and through a slot in the sleeve 66. The dowel and slot work together to limit the amount of axial movement of the sleeve 66. The tapered sleeve 66 accommodates for small variations in the size of the fastener apertures 24 or for any eccentricities in the positioning of the fastener apertures of the brake drum 12. When the drum is mounted on the positioning posts 60 as described below, the sleeve 66 is urged towards the drum outboard mounting face 28 by the spring 68 until the tapered portion 67 fills any space between the fastener aperture 24 and the locating stud 64 to provide a tight fit in the fastener aperture 24. Alternatively, the locating stud 64 may be tapered rather than using a tapered sleeve 66 to fill the apertures and provide a tight fit. Alternatively, the locating stud 64 may have a diamond shaped cross section for accommodating any irregularities in the position or shape of the fastener apertures 24.

The positioning plate 44 is preferably removable from the fixture to allow other positioning plates to be inserted having a different number, orientation or spacing of positioning posts so that the fixture may accept other brake drums having different fastener aperture configurations. Alternatively, the positioning plate 44 may include a plurality of sections, with each section having a positioning post secured thereto. Different sections having positioning posts disposed in predetermined locations can be combined to vary the number, orientation or spacing of the positioning posts in the fixture to accommodate a variety of different brake drums.

Figure 4:
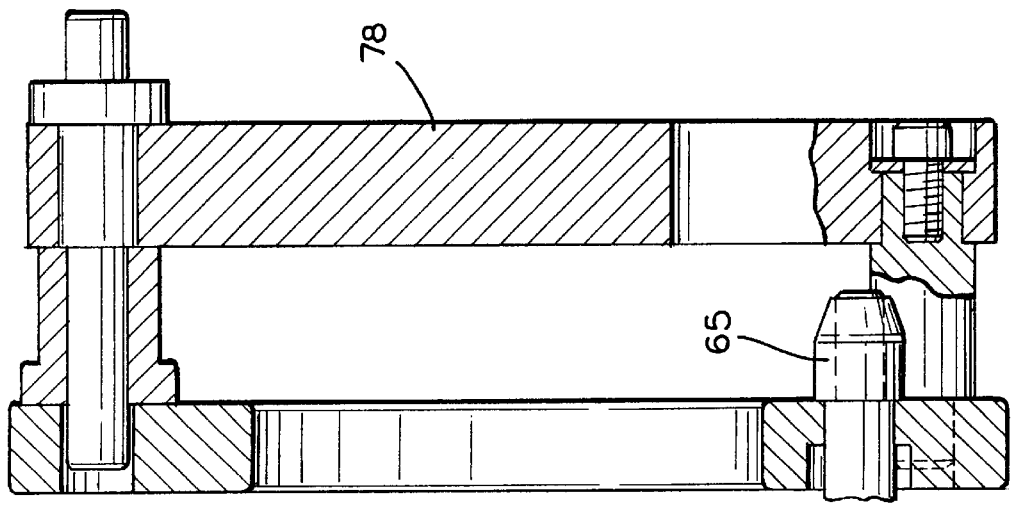
FIG. 4 is a side elevational view of the handle and receptacles shown in FIG. 3.
Figure 3:
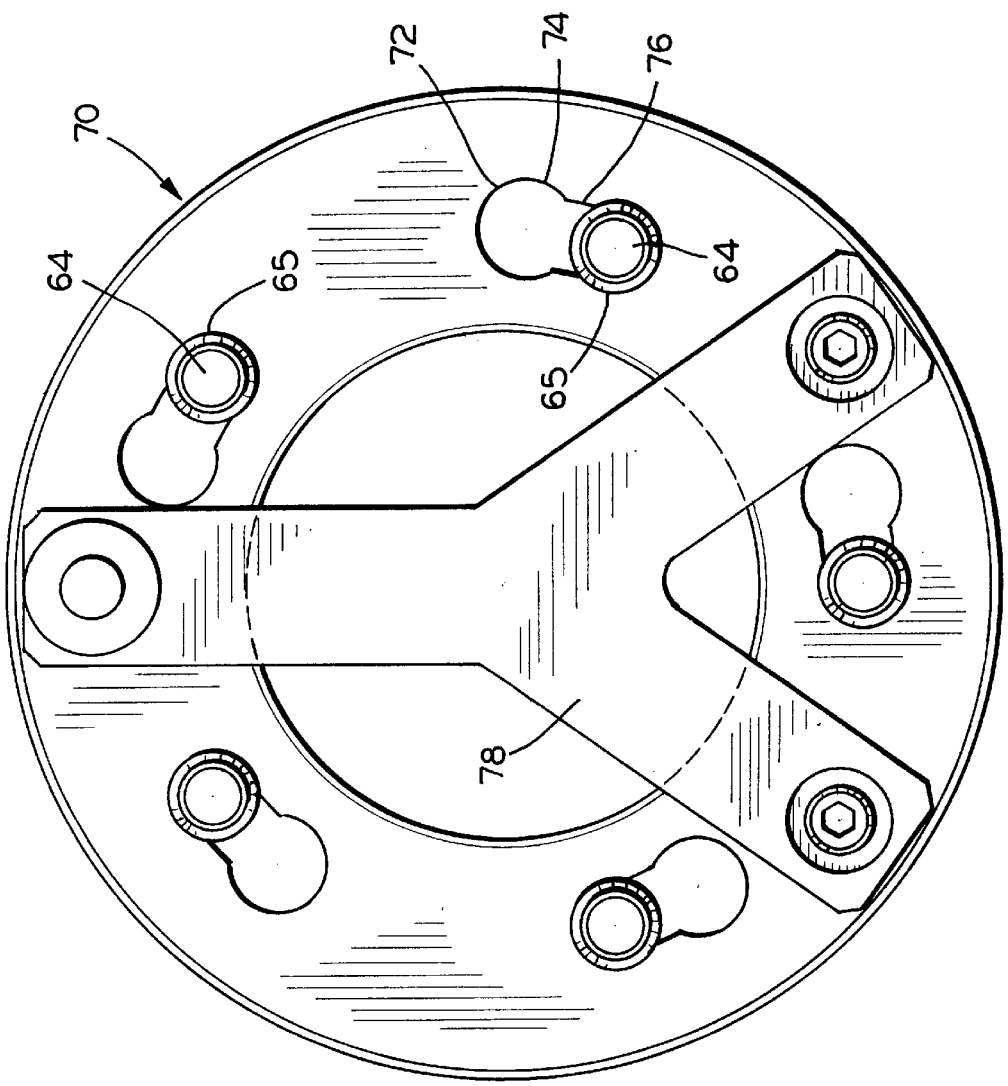
FIG. 3 is a plan view of the clamping flange shown in FIG. 1.

Referring now to FIGS. 1, 3 and 4, the clamping assembly further includes a clamping flange 70. The clamping flange 70 is preferably ring-shaped, although it may have any suitable shape. The clamping flange 70 includes a plurality of circumferentially spaced apertures 72 arranged to align with the fastener apertures 24 of the brake drum 12 to be machined. Accordingly, the arrangement of the flange apertures 72 also corresponds to the location of the positioning posts 60. The clamping flange apertures 72 include a larger diameter portion 74 having a diameter larger than the outer diameter of the retaining caps 65, and a smaller diameter portion 76 having a diameter larger than the outer diameter of the locating studs 64 but smaller than the outer diameter of the retaining caps 65. A handle 78 is removably attached to the clamping flange 70.

The operation of the clamping assembly 42 shall now be described. The brake drum 12 is placed in the fixture 10 and held therein for machining. To achieve the optimum results during machining, it is desired that the drum 12 be precisely positioned in the fixture 10 so that the axis of the drum 16 coaxially aligns with the axis of the fixture 34. The drum 12 is placed in the fixture by orienting the drum mounting face 20 so that the fastener apertures 24 are aligned with the locating studs 64. The drum 12 is then moved towards the clamping plate so that the positioning post locating studs 64 are received by the fastener apertures and the drum outboard mounting face 28 abuts the clamping face 54 of the clamping plate 50.

Since the fastener apertures 24 are formed in the drum mounting face 20 in predetermined locations relative to the drum axis 16 as described above, the drum axis can be located, and subsequently aligned with the fixture axis, by referencing the fastener apertures. This is done by placing the positioning posts 60 in a predetermined position relative to the fixture axis, so that the drum axis is aligned with the fixture axis when the positioning posts are received within the fastener apertures. Therefore, the brake drum 12 is accurately positioned or "squared up" on the fixture 10 by referencing the fixture apertures 24.

After the drum is placed on the fixture 10 so that the locating studs 64 extend through the fastener apertures 24, the clamping flange 70 is placed against the inboard mounting face 26 of the drum so that the locating studs extend through the large diameter portion of the apertures 74 of the clamping flange. The clamping flange 70 is then rotated by twisting the handle 78 so that the locating studs 64 extend through the smaller diameter portion 76 of the apertures 72, and the flange is held against the drum's inboard mounting face 26 by the retaining caps 65. The mounting face 20 of the drum 12 is now clamped between the clamping plate 50 and the clamping flange 70. The handle 78 is removed from the clamping flange prior to machining.

The piston 40 is then actuated by a fluid actuating system such as hydraulics, pneumatics or any other known actuator, to move axially towards the drum 12. As the piston 40 moves, the clamping plate 50 also moves towards the outboard mounting face 28 of the drum 12 increasing the clamping pressure against the mounting faces 26, 28 of the drum. The amount of force supplied by the piston 40 is adjustable and may be controlled by an operator to enable the fixture 10 to be used to machine workpieces made from different materials and workpieces having different thicknesses.

These clamping forces which compress the drum mounting faces 26, 28 simulate the forces exerted against the drum mounting faces by the wheel assembly and hub during operation of the brake drum on the vehicle. The simulation of these forces on the drum during machining improves accuracy of the machining process.

The fixture 10 further retains the brake drum 12 during machining using chucking assemblies, illustrated generally at 80, including a first plurality of chucking assemblies 82 and second plurality of chucking assemblies 84 for gripping the body portion 14 of the drum 12. The first plurality of chucking assemblies 82 preferably include approximately eighteen separate chucking assemblies 80 circumferentially spaced around the fixture body cavity near the open end 38, although any suitable number may be used. The chucking assemblies 80 are disposed within the walls of the fixture body cavity 32 and extend radially inwards towards the fixture axis 34. The first plurality of chucking assemblies 82 are arranged in a first plane which is generally perpendicular to the fixture axis 34.

The second plurality of chucking assemblies 84 includes a similar number of chucking assemblies 80 which are also circumferentially spaced around the open end 38 of the fixture body cavity 32. The second chucking assemblies 84 are disposed within a second plane which is substantially parallel to, and axially space apart along the fixture axis 34 from the first plane. Thus, when the drum 12 is mounted in the fixture 10 for machining, the first and second pluralities of chucking assemblies 82 and 84 grip the brake drum 12 along two different planes which are spaced apart from each other along the drum axis 16. Each of the chucking assemblies 80 of the first plurality of chucking assemblies 82 grip the brake drum 12 nearer to the mounting face 20 and may be referred to as a Lo-chuck assembly. Each of the chucking assemblies 80 of the second plurality of chucking assemblies 84 grip the brake drum 12 farther from to the mounting face 20 than the Lo-chuck assemblies, and may be referred to as a Hi-chuck assembly. However, the present invention is not limited to the use of only two pluralities of chucking assemblies disposed along two different planes, and may be practiced with more than two pluralities of chucking assemblies. The chucking assemblies 80 comprising the first and second plurality of chucking assemblies 82, 84 are similar, and only a single chucking assembly 80 will be described in detail.

Figure 5:
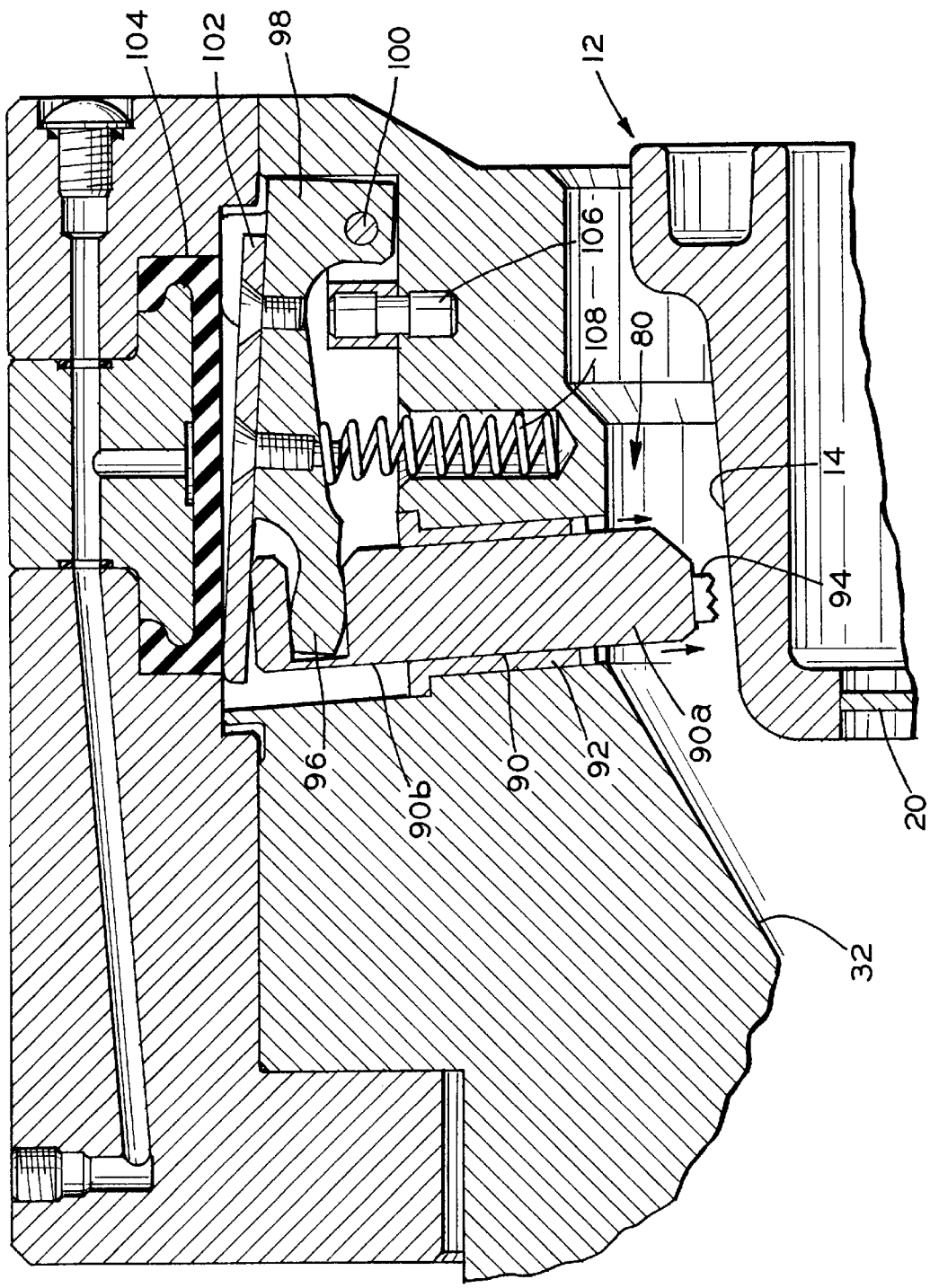
FIG. 5 is a sectional view of a chucking assembly shown in FIG. 1.
Figure 6:
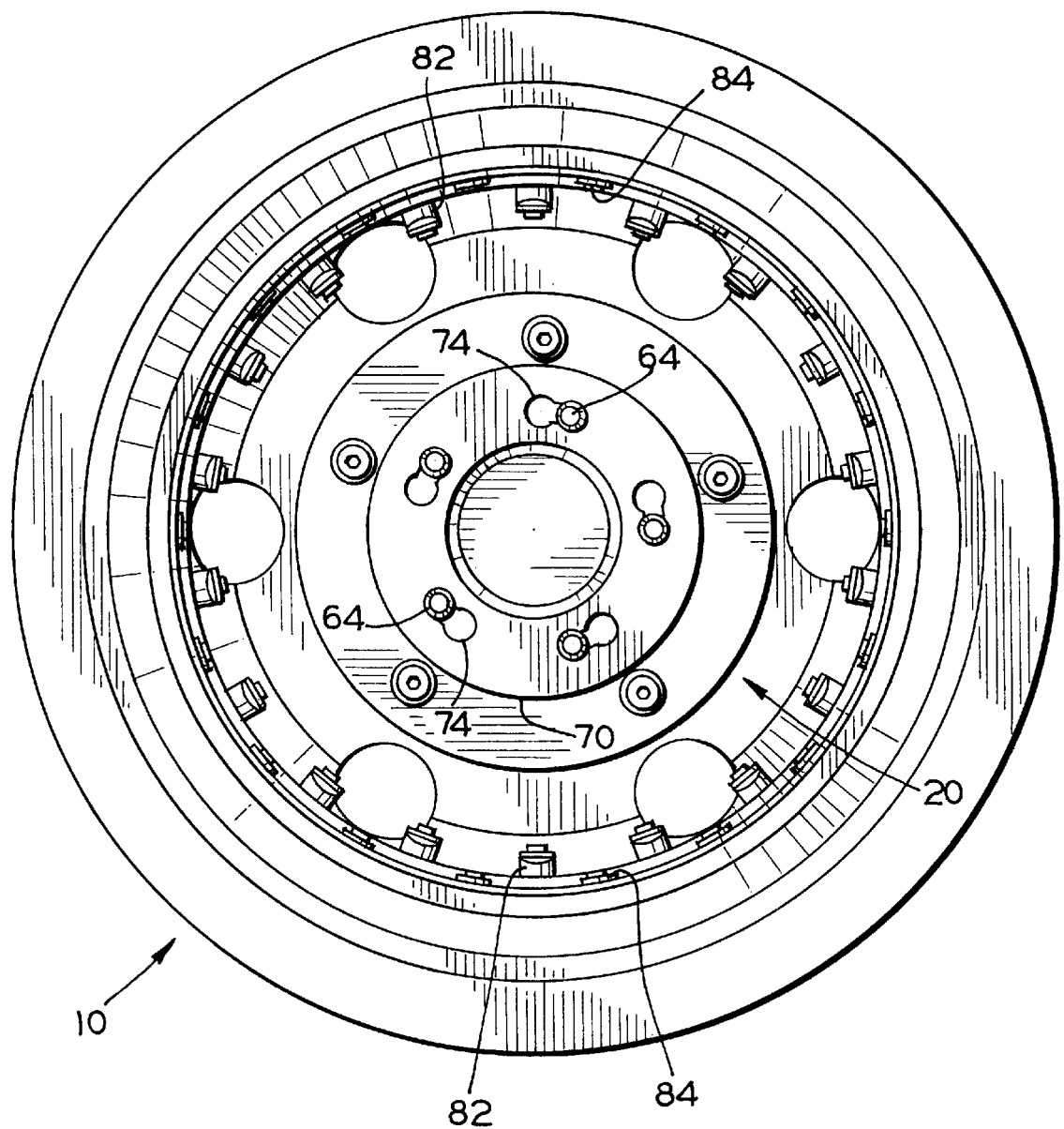
FIG. 6 is a plan view of the fixture without the brake drum according to the present invention.

Referring now to FIGS. 5 and 6, a chucking assembly 80 for gripping the body portion 14 of the brake drum 12 during machining is illustrated. The chucking assembly 80 includes a generally cylindrical chucking finger 90 extending out of the wall of the body cavity 32. The chucking finger 90 is mounted in a bushing 92 for movement along its longitudinal axis, which translates to radial movement relative to the cylindrical brake drum body (ie. movement towards or away from the brake drum axis 16). The chucking finger includes a first end 90a extending into the body cavity 32 having a gripper 94 disposed thereon for gripping the brake drum body 14 (as shown in FIG. 1). The gripper 94 is preferably made of carbide, although any suitably hard material may be used. The second end of the chucking finger 90b mabuts a distal end 96 of a lever arm 98. The lever arm 98 pivots at a pivot 100 at the end opposite the distal end. A removable wear plate 102 is secured to the lever arm. The wear plate 102 can be replaced after it wears appreciably.

A resilient bladder 104 abuts the wear plate 102. A source of pressurized fluid (not shown) such as hydraulics, pneumatics or the like, communicates with the bladder. When pressurized, the bladder 104 expands, filling any free space between the bladder and wear plate 102. As the bladder 104 expands further, it pushes against the wear plate 102 and lever arm 98, causing the chucking finger 90 to move towards the brake drum 12 until the gripper 94 grips the drum body 14. The amount of gripping force applied to the drum body 14 can be adjusted by regulating the fluid pressure applied to the bladder 104. An optional adjustment screw 106 may be used to set the maximum amount of movement of the lever arm 98 and thus the chucking finger 90. A spring 108 is disposed adjacent the lever arm to bias the lever arm 98 and thus the chucking finger 90 away from the brake drum 12. Thus, when the pressurized fluid is released from the bladder 104, the spring 108 urges the chucking finger 90 to return to its unactuated position away from the drum 12.

In the present invention, both the first and second pluralities of chucking assemblies 82, and 84 are supplied by the same fluid actuating system. In an alternate embodiment, the first and second pluralities of chucking assemblies 60 and 61 are in communication with separate fluid actuation systems which enables each plurality of chucking assemblies to apply different amounts of force to the brake drum. The combination of the two axially offset pluralities of chucking assemblies retains the brake drum in a manner to prevent distortion or deformation in the axial and radial direction.

A method for machining a brake drum or similarly shaped object using the above described fixture 10 shall now be described. A brake drum is provided having a center hole 22 and a plurality of fastener apertures 24 formed in the mounting face 20. The drum is loaded in the fixture and "squared up" so that the drum axis 16 is coaxially aligned with the fixture axis 34 by referencing the drum fastener apertures 24 as described above. The drum mounting face 20 is clamped in place against the fixture clamping face 54 using the clamping flange 70 as described above.

Using handle 78, the operator aligns the clamping flange 70 as previously stated and loads the clamping flange 70 onto the plurality of positioning posts 60. Next the handle 78 is used to rotate the clamping flange 70 to lock it into clamping engagement with the inboard mounting face 26. The handle 78 is then disconnected from the clamping flange 22.

The fluid actuating system is energized to move the piston 40 and clamping plate 58 into engagement with the outboard mounting face 28. The clamping force is adjusted to a predetermined amount by adjusting the fluid pressure as described above. The pressure may be manipulated either manually or under control of a device such as a programmable controller. Now the fixture 10 has been aligned to the axis of the brake drum and the clamping of the brake drum simulates the state of the brake drum during its intended use.

Next, pressurized fluid is introduced into the Hi and Lo chuck assembly bladders 104. The bladders expand moving the chucking bodies and grippers into engagement with the brake drum body portion 14 along the spaced apart planes as described above. The fluid actuation system is manipulated to apply a predetermined amount of force upon brake drum by each gripper 94.

The brake drum 12 is now retained in the fixture 10 and ready for machining. A cutting tool (not shown) is introduced to machine the radially inner surface 18 of the brake drum 12 in a conventional manner. Any suitable type of machining techniques may be used to machine brake drum.

Once the brake drum has been machined within the acceptable tolerance limits, the machining step is concluded. Both the first and second pluralities of chucking assemblies 82, and 84 are disengaged from the brake drum by relieving the fluid pressure in the bladders 104. Lastly, the clamping assembly 42 is disengaged by relieving the fluid pressure against the piston 40 and unclamping the clamping flange 70.

The present invention is not limited to the embodiment described above. The present invention may easily be modified to retain the interior of a brake drum for machining the outside of the respective brake drum. In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A fixture for holding a workpiece for machining, wherein said workpiece includes a hollow generally cylindrical body portion defining a workpiece axis, and an end portion extending radially inward from an end of said body portion and having a plurality of fastener apertures formed therein, said fixture comprising:

a body having a body cavity defining a fixture axis, said body cavity having an open end;

a clamping assembly mounted in said body cavity for clamping said end portion of said workpiece to said fixture;

a first plurality of chucking assemblies disposed in said body cavity for gripping a first section of said body portion of said workpiece; and a second plurality of chucking assemblies disposed in said body cavity for gripping a second section of said body portion of said workpiece, wherein said second section is spaced apart along said workpiece axis from said first section for reducing deformation of said workpiece.

2. The fixture defined in claim 1 wherein said clamping assembly includes a clamping plate having a clamping face for abutting the end portion of said workpiece when said workpiece is clamped by said clamping assembly.

3. The fixture defined in claim 2 wherein said clamping assembly includes a positioning plate and a plurality of positioning posts secured to said positioning plate, wherein said positioning posts are aligned to be received within said fastener apertures for clamping said workpiece in said clamping assembly.

4. The fixture defined in claim 3 wherein said positioning posts include locating studs extending from said positioning plate and retaining caps disposed on the distal ends of said locating studs, wherein the outer diameters of said retaining caps are larger than the outer diameters of said locating studs.

5. The fixture defined in claim 4 further including a clamping flange having a plurality of apertures for receiving said locating studs for clamping said end portion of said workpiece between said clamping flange and said clamping face of said clamping plate.

6. The fixture defined in claim 5 wherein said clamping flange apertures include a larger diameter portion having a diameter larger than the outer diameter of the retaining caps, and a smaller diameter portion having a diameter larger than the outer diameter of said locating studs but smaller than the outer diameter of said retaining caps.

7. The fixture defined in claim 6 further including a handle releasably secured to said clamping flange.

8. A fixture as defined in claim 5, wherein at least one of said locating studs includes a tapered portion.

9. A fixture as defined in claim 8, wherein at least one of said plurality of locating studs is diamond shaped.

10. A fixture as defined in claim 8 wherein said tapered portion is a sleeve mounted on said at least one of said locating studs for axial movement.

11. A fixture as defined in claim 9, wherein said at least one of said locating studs includes a spring disposed adjacent said sleeve for urging said sleeve towards said distal end of said locating stud.

12. A fixture as defined in claim 11, wherein said at least one of said locating studs includes a dowel pin extending therethrough, said dowel pin further extending through a slot in said sleeve for limiting the axial movement of said sleeve.

13. The fixture defined in claim 1 wherein at least one of said chucking assemblies of said first and second plurality of chucking assemblies includes a chucking finger disposed within said fixture body for radial movement.

14. A fixture as defined in claim 13 wherein said chucking finger further includes a gripper disposed on the end thereof for gripping the workpiece.

15. A fixture as defined in claim 14 wherein said gripper is constructed from carbide.

16. The fixture defined in claim 13 wherein said at least one of said chucking assemblies includes a lever arm abutting said chucking finger.

17. The fixture defined in claim 16 wherein said at least one of said chucking assemblies includes a resilient pliant bladder disposed adjacent said lever arm for urging said chucking finger radially inwards to grip said workpiece.

18. The fixture defined in claim 17 further including a wear plate secured to said lever arm adjacent said resilient pliant bladder.

19. A fixture as defined in claim 16 further including an adjustment screw disposed adjacent said lever arm for adjusting the position of said lever arm.

20. A fixture as defined in claim 17 further including a return spring disposed adjacent said lever arm for biasing said lever arm towards said resilient pliant bladder.

21. A fixture as defined in claim 1, wherein said fixture body further includes a passage extending into said body cavity.

22. A fixture as defined in claim 2, wherein said clamping plate further includes a recess formed in said clamping face coaxially disposed relative to said fixture axis.

23. A fixture for holding a brake drum for machining, wherein said brake drum includes a hollow generally cylindrical body portion defining a drum axis and an end portion extending radially inward from an end of said body portion, said end portion having a centrally disposed mounting face having an inboard surface and an outboard surface and a plurality of fastener apertures disposed therein, said fixture comprising:
   a body defining a body cavity having an open end; and
   a clamping assembly mounted in said body cavity for clamping the inboard and outboard surfaces of said brake drum mounting face during machining to simulate the compressive forces applied to said mounting face when said drum is mounted on a vehicle.

24. A fixture as defined in claim 23, wherein said drum mounting face has two opposing sides, and said clamping assembly includes a clamping plate for abutting one of said sides of said drum mounting face.

25. A fixture as defined in claim 24, wherein said clamping plate further includes a recess formed therein coaxially disposed relative to said fixture axis.

26. The fixture defined in claim 24 wherein said clamping assembly includes a plurality locating studs having distal ends extending from said clamping assembly, said locating studs being aligned to be received within said fastener apertures for clamping said drum mounting face against said clamping plate.

27. The fixture defined in claim 26 further including retaining caps disposed on the distal ends of said locating studs, wherein the outer diameters of said retaining caps are larger than the outer diameters of said locating studs.

28. The fixture defined in claim 27 further including a clamping flange having a plurality of apertures for receiving said locating studs for clamping said drum mounting face between said clamping flange and said clamping plate.

29. The fixture defined in claim 28 wherein said clamping flange apertures include a larger diameter portion having a diameter larger than the outer diameter of the retaining caps, and a smaller diameter portion having a diameter larger than the outer diameter of said locating studs but smaller than the outer diameter of said retaining caps.

30. The fixture defined in claim 29 further including a handle releasably secured to said clamping flange.

31. A fixture as defined in claim 28, wherein at least one of said locating studs is tapered.

32. The fixture defined in claim 23 further comprising:
   a first plurality of chucking assemblies disposed in said body cavity for gripping a first section of said body portion of said brake drum; and
   a second plurality of chucking assemblies disposed in said body cavity for gripping a second section of said body portion of said brake drum, wherein said second section is spaced apart along said drum axis from said first section for reducing deformation of said brake drum during machining.

33. The fixture defined in claim 32 wherein at least one of said chucking assemblies of said first and second plurality of chucking assemblies includes a chucking finger disposed within said fixture body for radial movement.

34. A fixture as defined in claim 33 wherein said chucking finger further includes a gripper disposed on the end thereof for gripping said brake drum.

35. The fixture defined in claim 34 wherein said at least one of said chucking assemblies includes a lever arm abutting said chucking finger.

36. The fixture defined in claim 35 wherein said at least one of said chucking assemblies includes a resilient pliant bladder disposed adjacent said lever arm for urging said chucking finger and said gripper radially inwards to grip said brake drum.

37. The fixture defined in claim 36 further including a wear plate secured to said lever arm adjacent said resilient pliant bladder.

38. A fixture as defined in claim 35 further including an adjustment screw disposed adjacent said lever arm for adjusting the position of said lever arm.

39. A fixture as defined in claim 36 further including a return spring disposed adjacent said lever arm for biasing said lever arm towards said resilient pliant bladder.

40. A fixture as defined in claim 23, wherein said fixture body further includes a passage extending into said body cavity.

41. A fixture for holding a brake drum for machining, wherein said brake drum includes a hollow generally cylindrical body portion defining a drum axis and an end portion extending radially inward from an end of said body portion, said end portion having a centrally disposed mounting face with a plurality of fastener apertures disposed therein, said fixture comprising:
   a body defining a body cavity having an open end;
   a positioning plate disposed within said body cavity; and
   a plurality of positioning posts secured to said positioning plate in predetermined positions to align with said fastener apertures and locate the brake drum in the fixture such that the drum axis is coaxially aligned with the fixture axis.

42. The fixture defined in claim 41 further including a clamping flange having a plurality of apertures for receiving said positioning posts for clamping said drum mounting face to said fixture.

43. The fixture defined in claim 41 further comprising:
   a first plurality of chucking assemblies disposed in said body cavity for gripping a first section of said body portion of said brake drum; and
   a second plurality of chucking assemblies disposed in said body cavity for gripping a second section of said body portion of said brake drum, wherein said second section is spaced apart along said drum axis from said first section for reducing deformation of said brake drum during machining.

44. The fixture defined in claim 43 wherein at least one of said chucking assemblies of said first and second plurality of chucking assemblies includes a chucking finger having a gripper disposed thereon, said chucking finger being disposed within said fixture body for radial movement.

45. The fixture defined in claim 44 wherein said at least one of said chucking assemblies includes a lever arm abutting said chucking finger.

46. The fixture defined in claim 45 wherein said at least one of said chucking assemblies includes a resilient pliant bladder disposed adjacent said lever arm for urging said chucking finger and said gripper radially inwards to grip said brake drum.

47. The fixture defined in claim 46 further including a wear plate secured to said lever arm adjacent said resilient pliant bladder.

48. A fixture as defined in claim 45 further including an adjustment screw disposed adjacent said lever arm for adjusting the position of said lever arm.

49. A fixture as defined in claim 46 further including a return spring disposed adjacent said lever arm for biasing said lever arm towards said resilient pliant bladder.

50. A method for locating a brake drum on a fixture for machining comprising the steps of:
   providing a fixture for holding a brake drum for machining, wherein said fixture includes a fixture axis;
   providing a brake drum including a hollow generally cylindrical body portion defining a longitudinal drum axis and an end portion extending radially inward from an end of said body portion, said end portion having a centrally disposed mounting face with a plurality of fastener apertures located in a predetermined position in said mounting face relative to the drum axis; and
   locating said brake drum in a predetermined position on the fixture such that said drum axis is coaxial to said fixture axis by referencing said plurality of fastener apertures.

51. A method as defined in claim 50 wherein said fixture further includes a plurality of positioning posts disposed in a predetermined position relative to said fixture axis.

52. A method as defined in claim 51 wherein said locating step further includes placing said drum on said positioning posts such that said positioning posts extend through said fastener apertures.

53. A method as defined in claim 52 further comprising the steps:
   providing a clamping flange having a plurality of apertures for receiving said positioning posts; and
   clamping said clamping flange against said drum mounting face to simulate the compressive forces applied to said drum mounting face when said drum is mounted on a vehicle.

54. A method for holding a brake drum on a fixture for machining comprising the steps of:
   providing a fixture for holding a brake drum for machining;
   providing a brake drum including a hollow generally cylindrical body portion defining a drum axis and an end portion extending radially inward from an end of said body portion, said end portion having a centrally disposed mounting face with a plurality of fastener apertures located in a predetermined position in said mounting face relative to the drum axis;
   locating said brake drum in a predetermined position on the fixture by referencing said plurality of fastener apertures; and
   clamping the drum mounting face to the fixture to simulate the compressive forces applied to the drum mounting face when the drum is mounted on a vehicle.

* * * * *